United States Patent

[11] 3,537,444

| [72] | Inventors | Bernard J. Garn<br>242 E. 72nd St., New York, N.Y., and<br>Ebrahim L. Victory, c/o N. Victory 30<br>Seasongood Road, Forest Hills, New York |
|---|---|---|
| [21] | Appl. No. | 578,664 |
| [22] | Filed | Sept. 12, 1966 |
| [45] | Patented | Nov. 3, 1970 |

[54] PULSATING DENTAL SYRINGE
12 Claims, 9 Drawing Figs.

[52] U.S. Cl. .................................................. 128/66
[51] Int. Cl. .................................................. A61h 9/00
[50] Field of Search ................................... 128/66, 62,
38—40, 224, 229, 366; 239/76, 102; 137/81.5,
624.14, 83; 4/145; 15/250.01; 68/184; 137/184

[56] References Cited
UNITED STATES PATENTS
| 3,158,166 | 11/1964 | Warren | 137/81.5 |
| 3,227,158 | 1/1966 | Mattingly | 128/66 |

Primary Examiner—L. W. Trapp
Attorney—Curtis, Morris and Safford

ABSTRACT: A dental device for cleaning teeth which is adapted to be attached to a source of liquid under pressure, such as a water faucet. The continuous stream of water from the faucet is directed to a fluid pulse generator which serves to develop a pulsating flow of liquid. The pulsating liquid flow is directed to a fluid ejecting unit which is held by a user who directs the pulsating flow on the teeth to be cleaned.

Patented Nov. 3, 1970
3,537,444
Sheet 1 of 2
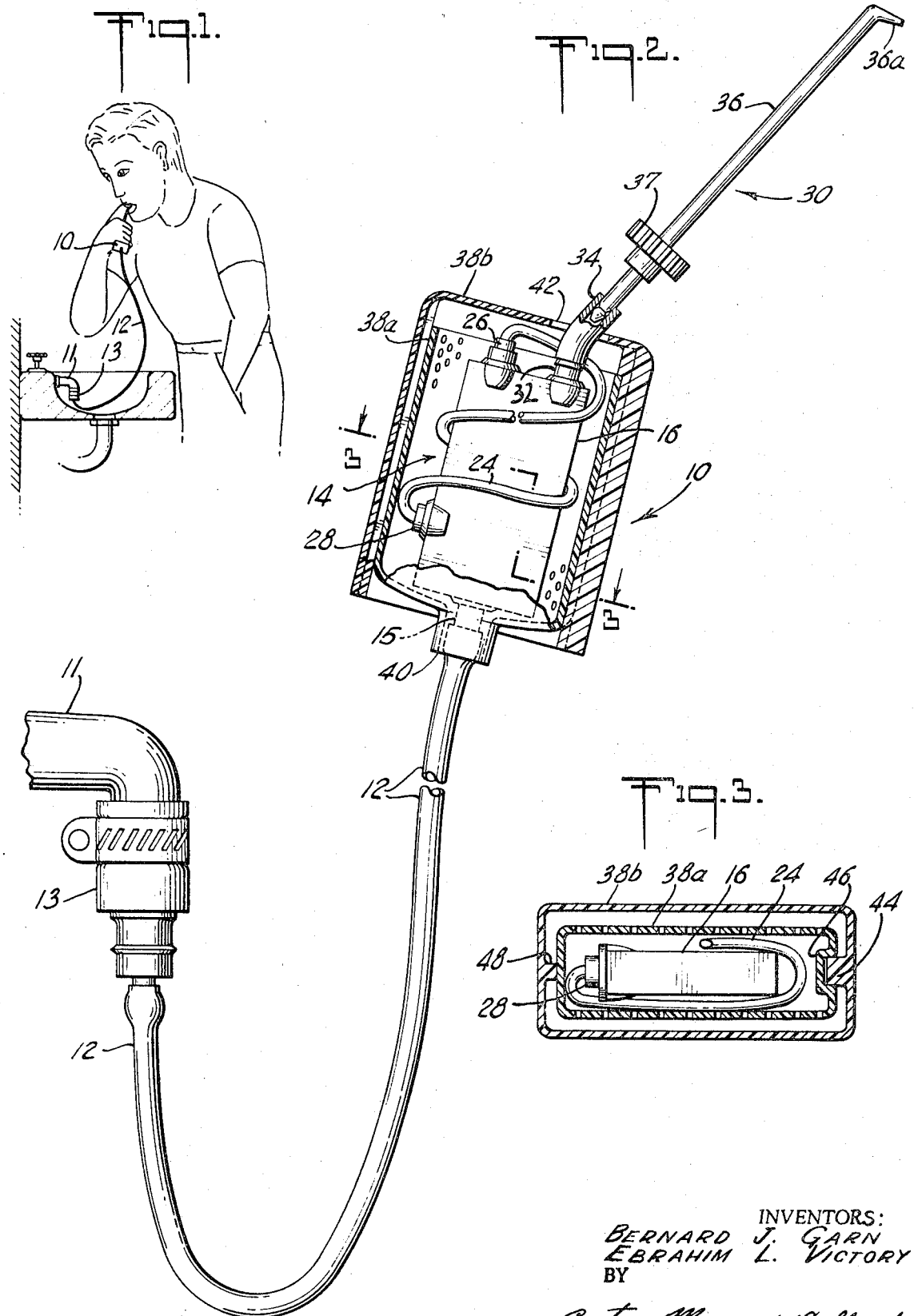
INVENTORS:
BERNARD J. GARN
EBRAHIM L. VICTORY
BY
Curtis, Morris & Safford
ATTORNEYS.

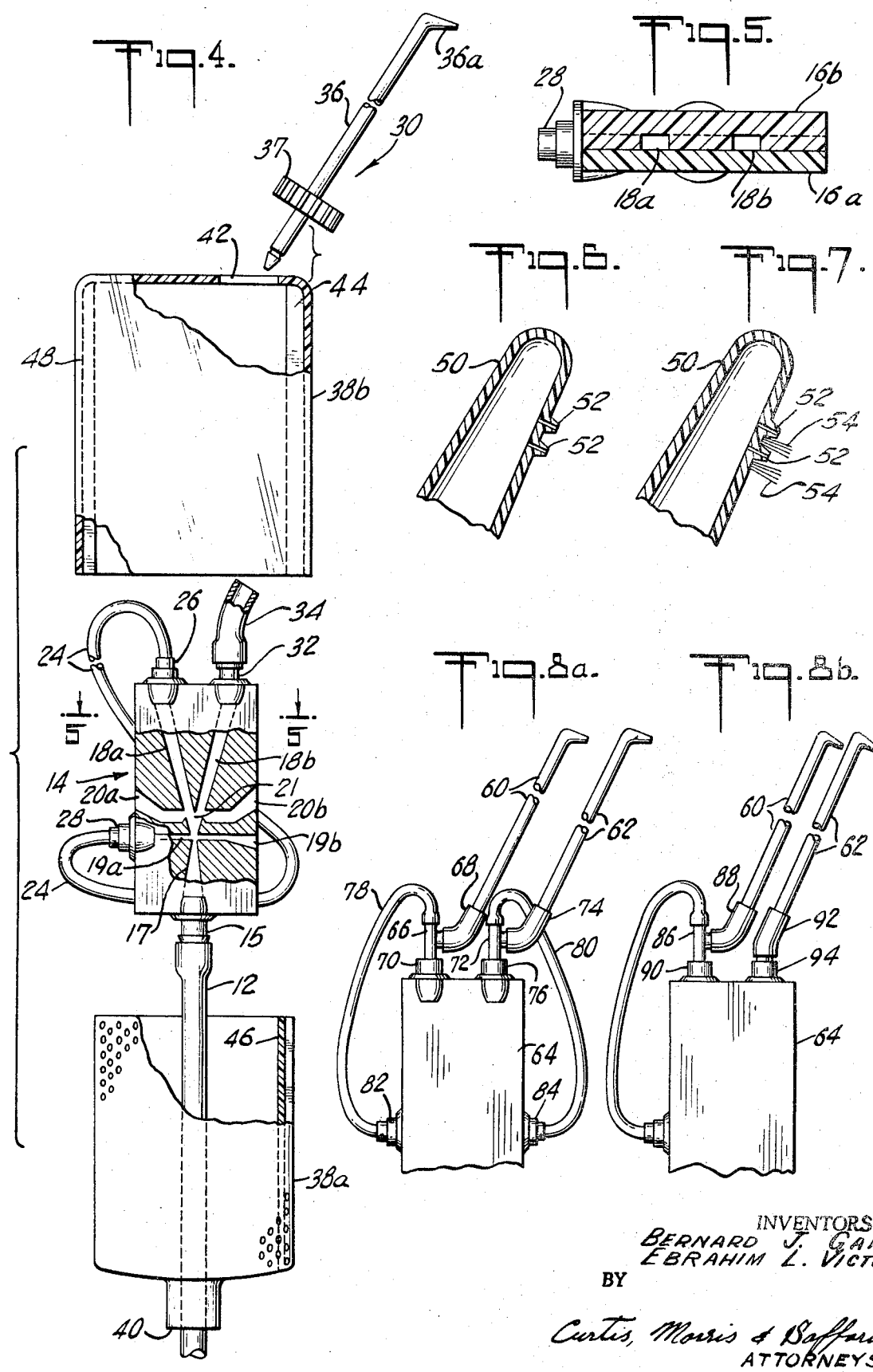

PULSATING DENTAL SYRINGE

The present invention relates to a dental device for cleaning teeth of the type which delivers fine bursts of cleaning liquid.

It is well known that food particles left between and around teeth and under the gums are a major cause of tooth decay. The use of a toothbrush is not always effective in removing residual food particles since some parts of the teeth cannot be reached by a toothbrush. Typical regions which are not accessible to a toothbrush are the embrasures between teeth, infected gum pockets, certain points beneath permanent false teeth, and certain points beneath and around orthodontic appliances.

Mouth sprays and liquid jet arrangements have been found to be more effective in cleaning these critical areas so that the use of these devices is being advocated more and more by dentists and dental experts. Despite the improvement realized through the use of these devices, those which are available presently, generally, are undesirable for one or more reasons, such as cost, complexity, size, the delivery of cleaning liquid at insufficient pressure and the need for a built-in power supply to develop the bursts of cleaning liquid.

Accordingly, it is an object of the present invention to provide a new and improved dental device for cleaning teeth.

It is another object of the present invention to provide a dental device which, in addition to cleaning teeth, massages the gums of the user.

It is a further object of the present invention to provide a dental device which is effective in removing food deposits, placque, and materia alba from parts of the teeth that cannot be reached by a toothbrush.

It is yet another object of the present invention to provide a dental device for cleaning teeth which converts a steady flow of liquid supplied under pressure from a sink faucet, for example, into fine bursts.

It is yet a further object of the present invention to provide a dental device for cleaning teeth which is relatively simple in construction and inexpensive to fabricate.

A feature of the present invention is that by the simple expedient of surrounding the openings through which the cleaning liquid is ejected with bristles, the device also may serve as a toothbrush and thus be a complete unit for mouth care.

For a better understanding of the present invention, together with other and further objects thereof, reference is made to the following description, taken in connection with the accompanying drawings, and its scope will be pointed out in the appended claims.

Referring to the drawings:

FIG. 1 illustrates the manner in which a dental device constructed in accordance with the present invention is employed in cleaning teeth;

FIG. 2 illustrates, partly in section, a dental device constructed in accordance with the present invention;

FIG. 3 is a horizontal section taken along line 3-3 of FIG. 2;

FIG. 4 shows the dental device of FIG. 2 disassembled with portions drawn in section;

FIG. 5 is a horizontal section taken along line 5-5 of FIG. 4;

FIGS. 6 and 7 show, in section, alternate forms of nozzles which may be employed in the dental device of FIGS. 2 and 4; and FIGS. 8a and 8b illustrate alternate nozzle arrangements which may be employed in the dental device of FIGS. 2 and 4.

As illustrated in FIG. 1, a dental device constructed in accordance with the present invention includes a fluid ejecting unit 10, small enough to fit comfortably in the hand of a user, connected to a standard sink faucet 11 by means of a hose 12 and a coupling 13. The faucet 11 serves as a fluid source and supplies a steady flow of water at a suitable pressure.

Referring to FIGS. 2, 3, 4 and 5, which illustrate the dental device in more detail, the coupling 13 may be a standard, commercially available device which, preferably, is adjustable so as to facilitate simple and rapid connections to a number of different size faucets. The opposite end of the hose 12 is coupled to a fluid pulse generator, designated generally by reference numeral 14, by means of a stem coupling 15. The fluid pulse generator 14 is responsive to the steady flow of liquid from the faucet 11 and serves to develop a pulsating flow of liquid from the steady flow of liquid. The particular form of the fluid pulse generator 14 illustrated includes a block 16 having an inlet passage 17, first and second outlet passages 18a and 18b, respectively, first and second control passages 19a and 19b, respectively, and first and second vent passages 20a and 20b, respectively. The block 16 may be formed by two flat plates 16a and 16b, best illustrated in FIG. 5, which may be made of a metal, plastic, ceramic or other suitable material and held together by an adhesive or other suitable means. The passages 17, 18a, 18b, 19a, 19b, 20a and 20b may be channels cut into both of the flat plates 16a and 16b, or, as illustrated, into only one of the flat plates (16b) which is thicker than the other. The arrangement of the passages 17, 18a, 18b, 19a, 19b, 20a and 20b is such that they communicate with one another through a chamber 21 with the outlet passages 18a and 18b in a fork pattern relative to the inlet passage 17. The pair of vent passages 20a and 20b is provided to conduct atmospheric pressure to the chamber 21 and also to drain liquid backing up from one or both of the outlet passages.

Extending between the outlet passage 18a and the control passage 19a is a connecting passage 24 which is in the form of a tubular member and is sufficiently flexible to permit wrapping it around the block 16. The tubular member 24 communicates with the outlet passage 18a and the control passage 19a through stem couplings 26 and 28, respectively.

Mounted on the fluid pulse generator 14 is a nozzle designated generally by reference numeral 30. The nozzle 30 communicates with outlet passage 18b through a stem coupling 32 and a flexible collar 34 fitted over the external portion of coupling 32. The nozzle 30 has a tubular section 36 which, at its free end, terminates in a tapered tip 36a and, at the opposite end, is shaped to be fitted into the collar 34 by means of a press fit. The tapered tip 36a provides a reduced outlet through which liquid is ejected. The tubular section 36 is provided with a disc 37, knurled along its edge, which facilitates inserting the nozzle into the flexible collar 34 and also turning the nozzle within the collar.

A two-part casing 38a, 38b is provided for enclosing the fluid pulse generator 14. The arrangement is such that part 38a is fitted within part 38b by means of a sliding insertion. Part 38a of the casing is provided with a first opening 40 through which the hose 12 passes freely, while part 38b of the casing is provided with a second opening 42 through which the collar 34 and nozzle 30 project. Part 38a of the casing is perforated to permit liquid from the fluid pulse generator 14 to drain from the casing. As illustrated most clearly in FIG. 3, the two parts of the casing are spaced apart. This arrangement permits liquid draining through the perforated part 38a to dribble downward in the space between the two parts of the casing when the device is employed as illustrated in FIG. 1. The casing part 38b is provided with an elongated key 44 which fits into a mating keyway 46 in casing part 38a by means of a sliding insertion. The key 44 along with a spacing strip 48 extending along a wall of casing part 38b opposite from the key 44 maintain the spacing between the two casing parts.

The disassembled dental device illustrated in FIG. 4 is assembled by first sliding casing part 38a along hose 12 and over the fluid pulse generator 14. Next, casing part 38b is slid over casing part 38a so that collar 34 projects through opening 42 in casing part 38b. Finally, the nozzle 30 is inserted into the collar 34.

In operation, a steady flow of liquid at suitable pressure is supplied from the faucet 11. This steady flow of liquid passes through the hose 12 to the fluid pulse generator 14. The liquid enters the fluid pulse generator 14 through the inlet passage 17. As the steady flow of liquid issues from the inlet passage 17 into the chamber 21 it is directed alternately between the two outlet passages 18a and 18b. This is accomplished as follows. The steady flow of liquid issuing from the inlet passage 17 initially is split into two streams which pass through both of the outlet passages 18a and 18b simultaneously. The stream passing through outlet passage 18a is conducted through the tubular passage 24 to the control passage 19a. This stream issuing from the control passage 19a into the chamber 21 deflects the flow of liquid issuing from the inlet passage 17 and diverts all, or substantially all, of this flow into outlet passage 18b. With the flow of liquid to outlet passage 18a interrupted, the flow of liquid through tubular passage 24 also is interrupted. This reduces the pressure within tubular passage 24 and control passage 19a. When the pressure within control passage 19a drops, all, or substantially all, of the flow of fluid issuing from inlet passage 17 is diverted back to outlet passage 18a because of the net effect of the atmospheric pressure introduced through vent passages 20a and 20b and the second control passage 19b. Again, the flow through outlet passage 18a is conducted through the tubular passage 24 to the control passage 19a to divert again the steady flow issuing from inlet passage 17 to outlet passage 18b. In this way, pulses of liquid issue alternately from the outlet passages 18a and 18b. The pulses of liquid issuing from outlet passage 18a are conducted through the tubular passage 24 to the control passage 19a to cause the alternation between the two outlet passages. The pulses of liquid which issue from outlet passage 18b pass to the nozzle 30 so that pulses of liquid are ejected from the nozzle through the tip 36a. These bursts of liquid ejected from the nozzle 30 dislodge food particles from and between the teeth and other areas as the tip 36a is guided along by the user. Because of the flexible mounting of the nozzle 30, as the liquid is ejected intermittently from the nozzle, the nozzle moves back and forth in response to this pulsating flow. This back and forth movement of the nozzle may be employed to massage the gums of the user by guiding the nozzle along the gums. This results in a pleasant and healthful stimulation of the gums.

FIG. 6 shows an alternate form of a nozzle which may be employed in the dental device of FIGS. 2 and 4. This nozzle 50 has two nipples 52 near its tip through which liquid under pressure is ejected. This arrangement of the nozzle is capable of providing a more diffused burst of the liquid as it is ejected.

FIG. 7 illustrates the nozzle 50 of FIG. 6 with bristles 54 surrounding the openings in the nipples 52. This arrangement permits the dental device to function as a toothbrush thus rendering the dental device a complete unit for mouth care.

FIGS. 8a and 8b illustrate alternate nozzle arrangements which may be employed in the dental device of FIGS. 2 and 4. In both FIG. 8a and FIG. 8b, a pair of nozzles 60 and 62 are mounted on the block 64 of the fluid pulse generator. The pattern of passages in block 64 is similar to the pattern of passages in block 16 of FIG. 4. In FIG. 8a, nozzle 60 communicates with one outlet passage of the fluid pulse generator through a T-coupling 66 and a flexible collar 68 which are mounted upon a stem coupling 70. In a similar manner, the nozzle 62 communicates with the second outlet passage of the fluid pulse generator through a T-coupling 72 and a flexible collar 74 which are mounted upon a stem coupling 76. The outlet passages of the fluid pulse generator, in turn, are connected individually to the two control passages by means of flexible tubular members 78 and 80, respectively, and stem couplings 82 and 84, respectively.

A major distinction in operation between the fluid pulse generator of FIG. 8a and the one of FIGS. 2 and 4 is that in the unit of FIG. 8a, the inlet stream is deflected back and forth between the two outlet passages by means of two control streams which individually are fed back from the outlet passages, whereas in the unit of FIGS. 2 and 4, only one control stream is employed. As liquid is being ejected from nozzle 60 in FIG. 8a, a portion of the stream passing through the associated outlet passage is conducted through tubular passage 78 to the associated control passage to deflect the inlet stream to nozzle 62. As liquid is being ejected from nozzle 62, a portion of the stream passing through the associated outlet passage is conducted through tubular passage 80 to the associated control passage to deflect the input stream back to nozzle 60. This cycle is repeated so that the nozzles alternately eject bursts of liquid. If desired, the lengths and diameters of the tubular passages 78 and 80 may be made unequal to develop different effects of the liquid bursts ejected by the nozzles.

In FIG. 8b, nozzle 60 communicates with one outlet passage of the fluid pulse generator through a T-coupling 86 and a flexible collar 88 which are mounted upon the stem coupling 90. Nozzle 62, however, is mounted on the block 64 of the fluid pulse generator in a manner similar to the mounting of nozzle 30 in FIGS. 2 and 4. In particular, nozzle 62 communicates with the second outlet passages of the fluid pulse generator through a flexible collar 92 mounted upon a stem coupling 94.

The operation of the unit of FIG. 8b is similar to the operation of the unit of FIGS. 2 and 4 in that a single control stream is employed to deflect the inlet stream in one direction with atmospheric pressure deflecting the inlet stream in the opposite direction. As is the case with the unit of FIG. 8a, liquid is ejected alternately from the nozzles 60 and 62 in FIG. 8b.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

We claim:

1. A dental device comprising:

a hose having a first end adapted to be coupled to a fluid source which supplies a steady flow of fluid under pressure;

a fluid pulse generator coupled to a second end of said hose and responsive to said steady flow of fluid for developing a pulsating flow of fluid from said steady flow of fluid;

and a flexibly mounted nozzle communicating with said fluid pulse generator for ejecting fluid intermittently, said flexibly mounted nozzle moving back and forth in response to said pulsating flow of fluid.

2. A dental device comprising:

a hose having a first end adapted to be coupled to a fluid source which supplies a steady flow of fluid under pressure;

a fluid pulse generator having an inlet passage coupled to a second end of said hose and through which said steady flow of fluid passes, first and second outlet passages communicating with said inlet passage and from which pulses of fluid issue alternately, a control passage connected by a connecting passage to the output of said first outlet passage and communicating with said inlet passage and through which pass the total output of the fluid pulses issuing from said first outlet passage thereby to divert said steady flow of said fluid as it issues from said inlet passage alternately between said outlet passages; and a nozzle communicating with said second outlet passage for ejecting said pulses of fluid issuing from said second outlet passage.

3. A dental device according to claim 2 wherein the outlet passages are arranged in a fork pattern with respect to the inlet passage.

4. A dental device according to claim 2 wherein the fluid pulse generator includes a block through which the inlet, outlet and control passages extend and the connecting passage is a tubular member.

5. A dental device according to claim 4 wherein the tubular member is flexible and is wrapped around the block.

6. A dental device comprising:

a hose having a first end adapted to be coupled to a fluid source which supplies a steady flow of fluid under pressure;

a fluid pulse generator composed of a block having an inlet passage, first and second outlet passages and a control passage, said inlet passage coupled to a second end of said hose so that said steady flow of fluid passes through said inlet passage, said first and second outlet passages communicating with said inlet passage and from which pulses of fluid issue alternately, said control passage communicating with said inlet passage and through which pass pulses of fluid issuing from said first outlet passage to direct said steady flow of fluid as it issues from said inlet passage alternately between said outlet passages, and a flexible tubular member connecting passage wrapped around said block and extending between said first outlet passage and said control passage to conduct said pulses of fluid issuing from said first outlet passage to said control passage;

a nozzle communicating with said second outlet passage for ejecting said pulses of fluid issuing from said second outlet passage; and and a casing enclosing said fluid pulse generator and having a first opening through which said hose passes and a second opening through which said nozzle projects.

7. A dental device according to claim 6 wherein the casing is perforated to permit drainage.

8. A dental device according to claim 2 wherein the nozzle is flexibly mounted on the fluid pulse generator so that said nozzle moves back and forth in response to the pulses of fluid issuing from the second outlet passage.

9. A dental device according to claim 8 wherein the free end of the nozzle has a plurality of openings through which fluid is ejected.

10. A dental device according to claim 9 wherein the openings in the free end of the nozzle are surrounded by bristles.

11. A dental device according to claim 1 wherein the first end of the hose is provided with an adjustable coupling adapted to fit a faucet.

12. A dental device according to claim 8 wherein the free end of the nozzle terminates in a tapered tip having an opening through which fluid is ejected.